United States Patent [19]
Andreani et al.

[11] Patent Number: 5,716,427
[45] Date of Patent: Feb. 10, 1998

[54] EQUIPMENT FOR GAS SEPARATION BY ADSORPTION

[75] Inventors: Philippe Andreani, Le Kremlin Bicetre; Christian Monereau, Paris, both of France

[73] Assignee: L'Air Liquide, Societe Anonyme Pour L'Etude et L'Exploitation des Procedes Georges Claude, Paris Cedex, France

[21] Appl. No.: 698,320

[22] Filed: Aug. 15, 1996

[30] Foreign Application Priority Data

Aug. 21, 1995 [FR] France ................... 95 09945

[51] Int. Cl.⁶ ........................... B01D 53/04
[52] U.S. Cl. ................ 95/90; 95/117; 96/130; 96/143
[58] Field of Search ............. 96/108, 121, 130–143, 96/154; 95/90, 96–105, 117, 121, 130, 138

[56] References Cited

U.S. PATENT DOCUMENTS

| 2,181,672 | 11/1939 | Sutcliffe et al. | 96/139 X |
| 2,556,292 | 6/1951 | Newcum | 96/131 |
| 3,064,819 | 11/1962 | Jones | 96/132 X |
| 4,095,965 | 6/1978 | Neumann et al. | 96/131 X |
| 4,350,502 | 9/1982 | Spatola | 96/108 X |
| 4,544,384 | 10/1985 | Metschl et al. | 96/130 |
| 4,698,072 | 10/1987 | Rohde et al. | 96/131 X |
| 4,997,465 | 3/1991 | Stanford | 96/130 |
| 5,145,494 | 9/1992 | Sowinski | 96/108 X |
| 5,176,721 | 1/1993 | Hay et al. | 96/143 X |
| 5,232,479 | 8/1993 | Poteau et al. | 96/131 |
| 5,538,544 | 7/1996 | Nowobilski et al. | 96/139 X |
| 5,593,475 | 1/1997 | Minh | 96/130 X |
| 5,593,477 | 1/1997 | Elson | 96/108 |

FOREIGN PATENT DOCUMENTS

| 3802997 | 8/1989 | Germany | 96/130 |
| 3939518 | 6/1991 | Germany | 96/108 |
| 60-137431 | 7/1985 | Japan | 96/131 |
| 62-191016 | 8/1987 | Japan | 96/132 |
| 6-319933 | 11/1994 | Japan | 96/108 |
| 1281287 | 1/1987 | U.S.S.R. | 96/130 |
| 1581357 | 7/1990 | U.S.S.R. | 96/130 |
| 1607903 | 11/1990 | U.S.S.R. | 96/131 |
| 2076690 | 12/1981 | United Kingdom | 96/121 |

*Primary Examiner*—Robert Spitzer
*Attorney, Agent, or Firm*—Young & Thompson

[57] ABSTRACT

The equipment, for example of the PSA type, comprises gas circulation elements for passing the gas horizontally through an adsorbent (3), which comprise, on at least one vertical side of the adsorbent, a gas distribution volume comprising a first subvolume (5; 9) adjacent to the adsorbent, and a second subvolume (6; 10) separated from the first subvolume by a wall provided with passages (40) having cross-sections and/or a distribution which are selected so as to reduce the variations in local flow rate along the adsorbent. The equipment is particularly useful in separating gases from air.

13 Claims, 1 Drawing Sheet

5,716,427

EQUIPMENT FOR GAS SEPARATION BY ADSORPTION

FIELD OF THE INVENTION

The present invention relates to equipment for gas separation by adsorption, more particularly of the PSA or VSA (Pressure/Vacuum Swing Adsorption) type, of the type comprising, in a casing, at least one vertical sector of at least one adsorbent, and gas circulation means for feeding, passing substantially horizontally through the adsorbent and discharging a gas flow in and from the casing.

BACKGROUND OF THE INVENTION

This type of separation equipment, treating high gas flow rates with fast cycle sequences, poses problems with regard to circulation and distribution of the gases, which are further heightened in equipment involving horizontal passage of the gas flow through the adsorbent, as is the case in this context.

SUMMARY OF THE INVENTION

The object of the present invention is to propose new arrangements of equipment for gas separation by adsorption, making it possible to obtain an improved gas distribution in a compact overall arrangement with low manufacturing costs, and with minimal energy consumption.

To this end, according to one characteristic of the invention, the circulation means comprise, on at least one vertical side of the adsorbent, a gas distribution volume comprising a first subvolume adjacent to the adsorbent and a second subvolume, separated from the first subvolume by a wall provided with gas passages having cross-sections and/or a distribution which are selected so as to reduce the vertical variations in local flow rates on the said side of the adsorbent, while creating minimal head losses.

According to other characteristics of the invention:

- the first and second subvolumes have substantially the same axial extent;
- the ratio of the volume of the first subvolume to the volume of the second subvolume is less than 4 and typically greater than 0.25;
- the ratio of the total surface area of the passages to the inlet/outlet surface area of the second subvolume is less than 5, typically greater than 0.5;
- the circulation means comprise vertical feed and discharge segments;
- the adsorbent is annular;
- the feed and discharge segments are connected, on the same axial side of the casing, to gas circuits.

BRIEF DESCRIPTIONS OF THE DRAWINGS

Other characteristics and advantages of the present invention will emerge from the following description of embodiments which are provided by way of illustration but without implying any limitation, which is given in conjunction with the appended drawings, in which:

FIG. 1 is a schematic view in vertical section of equipment according to the invention; and FIG. 2 is a view in vertical section of a particular embodiment of equipment according to the invention.

DETAILED DESCRIPTION OF THE INVENTION

Figure 1:
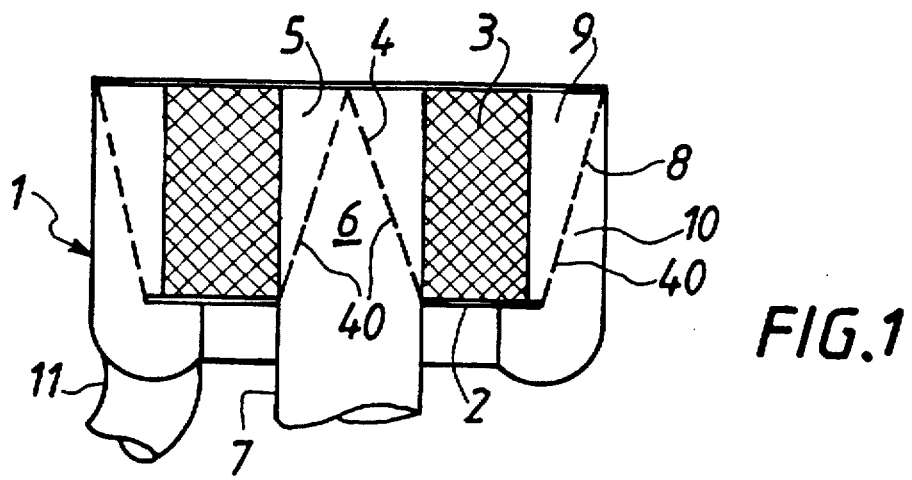

In the following description and in the drawings, identical or similar elements have the same reference numbers.

In the embodiment represented in FIG. 1, an annular volume of adsorbent 3 is arranged on an annular base 2 in an axisymmetric casing, denoted overall by the reference 1, this volume being internally and externally bounded by concentric grids. The volume internal to the adsorbent 3 is divided, by a perforated surface 4 which is here of conical geometry formed with a pattern of angularly and axially distributed perforations 40, into a first subvolume 5 adjacent to the adsorber and a second subvolume 6 communicating with a central pipe 7 intended for introducing a gas mixture to be separated into the adsorbent 3. In the embodiment in FIG. 1, the annular space between the peripheral shell ring of the casing 1 and the periphery of the adsorbent 3 is, in similar fashion, divided by a perforated surface 8, here of conical shape, into a first subvolume 9 adjacent to the adsorbent and a second subvolume 10 communicating, via an annular passage between the periphery of the base 2 and the peripheral shell ring of the casing, with a lower chamber formed in this casing and communicating with an exit pipe 11 for the gas not retained by the adsorbent 3 and therefore separated from the gas mixture introduced via the pipe 7.

According to one aspect of the invention, the ratio of the volume 5 to the volume 6 (or of the volume 9 to the volume 10) is less than 4, preferably between 0.4 and 1.5. According to another aspect of the invention, the ratio of the total surface area of the perforations 40 to the cross-section of the inlet pipe 7 is less than 5, preferably between 1 and 2.5 (the same is true as regards the ratio of the cross-sections of the perforations 40 in the wall 8 to the cross-section of the annular inlet of the volume 10).

With this arrangement, the perforations ensure, with very low head loss and therefore without energy loss, a primary distribution such that the deviations between local flow rates feeding the subvolume will typically be less than 30%. These variations can be reduced to 15% or less by producing variable perforations and/or by optimizing the geometry of the perforated surface and/or by increasing the head loss through at least some of these perforations at the cost of a slight increase in energy requirement.

The downstream subvolume (5 or 9 depending on the gas circulation direction) then ensures final rebalancing of the local flow rates by virtue of the downstream head loss in the adsorbent bed, as well as the diffusion of the jets output by the perforations in order to avoid local pressure variations due to the kinetic energy of the jets at the adsorbent containment grid.

With such an arrangement, the longitudinal flow rate, which ensures almost perfect rebalancing of the pressures in the axial direction of the system, is low compared to the feed flow rate, which makes it possible to use rings of small dimension and therefore to produce equipment with compact configuration.

The embodiment in FIG. 2 again contains the central distributor which has just been described, here constituted by a straight perforated tube 4 extending the axial feed tube 7. The equipment represented does not here have an external distributor, only a thin annular chamber 12 being formed between the peripheral shell ring of the chamber 1 and the periphery of the annular adsorbent 3. In this embodiment, the casing 1 has domed upper and lower ends, the latter defining, with the base 2, an annular lower chamber which is coaxial with the tubes 7 and 4 and includes an annular partition 13 provided with angularly distributed openings regulating the flow from and to the pipe 11. The upper dome comprises a central shaft making it possible to load the adsorbent which is axially compressed by a leaktight membrane 14 which is fixed between the shell ring of the casing and a central flange 15 for closing off the tube and is actively compressed, for example by a pressurized gas introduced into the upper dome, to prevent any risk of bypass of the adsorbent mass 3 between the chambers 5 and 12.

In the embodiment represented, in order to ensure better diffusion of the jets output by the perforations 40 of the central tube 4 before the adsorbent mass 3 is reached, a ring 16 of metal lining elements, of ceramic balls or advantageously, when the gas mixture to be separated contains water vapour, of alumina balls which will contribute to the retention of water vapour, will be provided between the adsorbent mass 3 and the subvolume 5.

Figure 2:
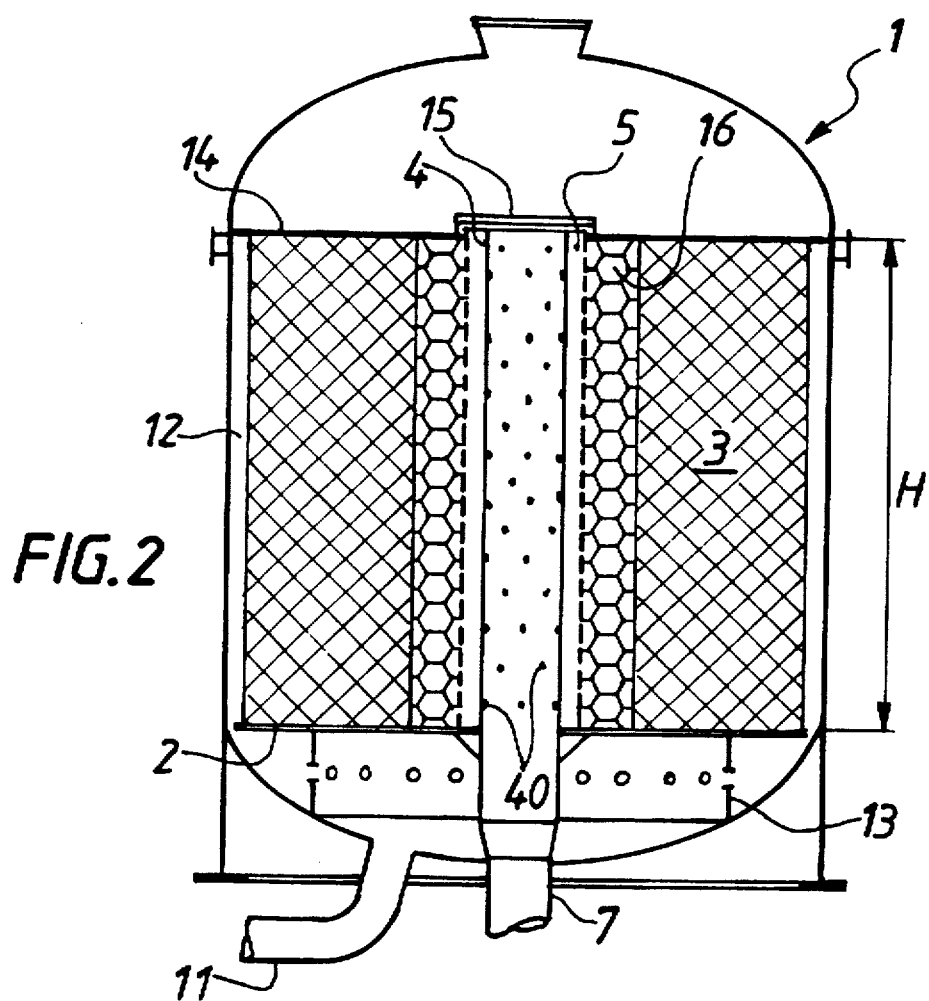

By way of comparison, equipment according to the embodiment in FIG. 2, with an adsorbent height H of 5 m, an adsorbent external diameter of 1.54 m, an adsorbent internal diameter of 40 cm, a 30 cm diameter perforated tube 4 having a perforation ratio of 2.4%, i.e. a total perforation surface area of approximately 1.6 times the cross-section of the tube 4, provides, with a 0.78 ratio of the first subvolume (5) to the second subvolume (6), the same distribution quality and the same performance as an annular adsorbent of external diameter 1.74 and a single central feed passage of 90 cm diameter, with the same overall adsorbent volume of approximately 8.65 $m^3$. Note will be made of the compactness and the dead-volume reduction afforded by the arrangement according to the invention, in contrast to those solutions, unacceptable on grounds of size and cost, which would involve installing distribution volumes with large cross-sections in order to negate the pressure variations due to the frictional head losses and to the kinetic energy variations of the gases or those creating large head losses, of the porous-material distributor type.

We claim:

1. Process for separating gases from air by adsorption, which comprises:

providing, in a casing, at least one vertical sector of at least one adsorbent, and gas circulation means for feeding, passing horizontally through the adsorbent and discharging a gas flow, wherein the circulation means comprise on at least one vertical side of the adsorbent, a gas distribution volume comprising a first subvolume adjacent to the adsorbent and a second subvolume, separated from the first subvolume by a wall provided with passages having cross-sections and/or a distribution which are selected so as to reduce the vertical variations in local flow rates on said side of the adsorbent;

feeding air through the circulation means whereby the air is passed through the adsorbent, the gases are separated from the air, and a purified air having gases separated therefrom is discharged from the circulation means.

2. Equipment for gas separation by adsorption, comprising, in a casing, at least one vertical sector of at least one adsorbent, and gas circulation means for feeding, passing horizontally through the adsorbent, and discharging a gas flow, wherein the circulation means comprise, on at least one vertical side of the adsorbent, a gas distribution volume comprising a first subvolume adjacent to the adsorbent and a second subvolume, separated from the first subvolume by a wall provided with passages having cross-sections and/or a distribution which are selected so as to reduce the vertical variations in local flow rates on said side of the adsorbent.

3. Equipment according to claim 2, wherein the first and second subvolumes have substantially the same axial extent.

4. Equipment according to claim 2, wherein the ratio of the volume of the first subvolume to the volume of the second subvolume does not exceed 4.

5. Equipment according to claim 2, wherein the ratio of the overall cross-section of the passages to the inlet/outlet cross-section of the second subvolume does not exceed 5.

6. Equipment according to claim 2, wherein the circulation means comprise vertical feed and discharge segments.

7. Equipment according to claim 6, wherein the adsorbent is annular.

8. Equipment according to claim 7, wherein the wall provided with passages consists of a tube which is arranged coaxially in the adsorbent, and the passages are perforations which are angularly and axially distributed on the tube.

9. Equipment according to claim 8, further comprising an annular layer of divided materials which are arranged radially inside the adsorbent.

10. Equipment according to claim 9, wherein the divided materials comprise alumina balls.

11. Equipment according to claim 6, wherein the feed and discharge segments are connected, on the same axial side of the casing, to gas circuits.

12. Equipment according to claim 11, wherein the casing comprises a side shell ring and a base and includes a transverse partition which supports the adsorbent and defines, with the base, a lower chamber communicating with an annular space between the shell ring and the periphery of the adsorbent.

13. Equipment according to claim 11, further comprising a membrane pressed onto the upper part of the adsorbent.

\* \* \* \* \*